United States Patent
Suzuki et al.

(10) Patent No.: US 6,177,754 B1
(45) Date of Patent: Jan. 23, 2001

(54) ULTRASONIC MOTOR AND ELECTRONIC APPARATUS WITH ULTRASONIC MOTOR

(75) Inventors: Makoto Suzuki; Akihiro Iino; Masao Kasuga; Kenji Suzuki; Takashi Yamanaka, all of Chiba (JP)

(73) Assignee: Seiko Instruments Inc. (JP)

( * ) Notice: Under 35 U.S.C. 154(b), the term of this patent shall be extended for 0 days.

(21) Appl. No.: 09/219,996

(22) Filed: Dec. 23, 1998

(30) Foreign Application Priority Data

Dec. 26, 1997 (JP) .................................................. 9-361309

(51) Int. Cl.$^7$ .................................................. H01L 41/04
(52) U.S. Cl. .................................................. 310/323.09
(58) Field of Search .................. 310/323.09, 323.11; 384/907.1, 913

(56) References Cited

U.S. PATENT DOCUMENTS

| | | | |
|---|---|---|---|
| 3,938,868 | * | 2/1976 | VanWyk ................................ 384/278 |
| 5,006,746 | * | 4/1991 | Kasuga et al. ........................ 310/323 |
| 5,056,201 | * | 10/1991 | Kasuga et al. ........................ 29/25.35 |
| 5,247,220 | * | 9/1993 | Miyazawa et al. ................... 310/323 |
| 5,479,380 | * | 12/1995 | Miyazawa et al. ................... 368/157 |
| 5,760,529 | * | 6/1998 | Tamai et al. .......................... 310/323 |
| 5,941,647 | * | 8/1999 | Koike et al. ......................... 384/907.1 |

* cited by examiner

Primary Examiner—Nestor Ramirez
Assistant Examiner—Peter Medley
(74) Attorney, Agent, or Firm—Adams & Wilks

(57) ABSTRACT

An ultrasonic motor has a piezoelectric element having an electrode pattern and driven by a voltage signal to undergo expansion and compression. An oscillator is connected to the piezoelectric element and is vibrationally driven by the expansion and compression movement of the piezoelectric vibrator. A rotor is disposed on the oscillator to be frictionally driven by expansion and compression movement of the piezoelectric element. A pivot member is connected to a central portion of the rotor. A pressing member is in pressure contact with the pivot member for urging the rotor into pressure contact with the oscillator. The pressing member and the pivot member are comprised of different materials, and the material of the pivot member has a hardness greater than that of the pressing member.

17 Claims, 4 Drawing Sheets

ULTRASONIC MOTOR AND ELECTRONIC APPARATUS WITH ULTRASONIC MOTOR

BACKGROUND OF THE INVENTION

The present invention relates to an ultrasonic motor used for a clock, an automatic focusing system of a camera, an opening and closing operation of a shutter and a drive operation of an X-Y stage, and more particularly to an improvement of an ultrasonic motor and an electronic apparatus with an ultrasonic motor which reduces an abrasion in a pressure-contact portion between a pressing member and a pivot member.

In recent days, an attention has been given to an ultrasonic motor which generates an oscillating wave in an oscillator connected to a piezoelectric element and which can move a moving body by applying a frictional force due to the oscillator (for example, refer to Japanese Patent Examined Publication No. 62-92781).

Further, an ultrasonic motor of a rotating type is provided with an oscillator fixed to a central shaft, a piezoelectric element connected to a lower surface of the oscillator, a rotor brought into contact with a projection provided in the oscillator, a pivot fixed to a rotating center of the rotor, and a pressing spring for pressing the pivot (for example, refer to Japanese Patent Unexamined Publication No. 8-107686).

In accordance with this structure, the pressing spring urges the pivot so as to apply a pressing force to the rotor and the oscillator, generates a suitable frictional force to the rotor and the projection in the oscillator, and rotates the rotor in a predetermined direction.

However, since the pressing spring and the pivot are made of the same kind of material, both are hard cohered and abraded. Further, even when a lubricating oil is supplied between the pivot and the pressing spring, the lubricating oil is lost after the rotor rotates for a long time rotation, so that the pivot and the pressing spring are abraded.

As a result abrasion of the pivot or the pressing spring is associated with the problems of changing the pressing force and the frictional force, lowering a rotating speed of the rotor and a torque of the motor, and further stopping the motor.

Further, since the pivot is always pressure-contact at the same point with the pressing spring, there is a problem that a load of the pivot against the frictional force generated in the pressure-contact portion is great, so that the pivot is highly abraded.

SUMMARY OF THE INVENTION

It is an object of the present invention to provide an ultrasonic motor and an electronic apparatus with an ultrasonic motor which prevents an abrasion of a pivot member and a pressing member so as to prevent a rotating speed of a rotor from lowering and prevent a torque from lowering.

An ultrasonic motor according to the present invention comprises a piezoelectric element, an oscillator connected to the piezoelectric element, a rotor brought into contact with the oscillator, a pivot member provided in a rotating center of the rotor and a pressing member pressure-contacting to the pivot member wherein the pressing member and the pivot member are made of different materials mutually different from each other.

In this case, the pressing member includes any of a plate spring and a structure in which a plate-like member is mounted to a distal end of a rubber or a spring.

It is preferable that the pivot member is made of a rigid material in view of transmitting a pressing force to the rotor, and it is preferable that the pressure-contact portion with the pressing member is formed in a spherical shape, a pin shape or a triangular conical shape in view of reducing a frictional force generated between the pressure-contact portion and the pressing member.

A material for the pressing member includes a stainless steel, a spring steel, a BeCu, a phosphor bronze.

A material for the pivot member includes a steel hardened by a heat treatment, a stainless steel, and ceramics such as an $Al_2O_3$, a SiC and $Si_3N_4$.

In accordance with this structure, the piezoelectric element is excited so as to generate an oscillating wave in the oscillator, whereby the oscillator is brought into contact with the rotor at every period. The pressing member is brought into pressure contact with the pivot member so as to press, the pressing force is transmitted to the rotor so as to generate a frictional force in the contact portion between the rotor and the oscillator, and the rotor is rotated due to the frictional force. When the rotor is rotated, a friction is generated in the pressure-contact portion between the pressing member and the pivot member. The friction is reduced by making the pressing member and the pivot member of materials mutually different from each other in comparison with the case that the same kind of material is used for both, and the pressing force to the rotor and the frictional force are maintained.

Accordingly, the friction of the pivot member and the pressing member can be reduced, and the reduction of the rotating speed and the torque of the rotor can be prevented.

In another embodiment an ultrasonic motor according to the present invention comprising a piezoelectric element, an oscillator connected to the piezoelectric element, a rotor brought into contact with the oscillator, a pivot member provided in a rotating center of the rotor and a pressing member pressure-contacting to the pivot member, a hardness of the pivot member being greater than that of the pressing member.

In accordance with this structure, since the hardness of the pivot member is greater than that of the pressing member, abrasion of the pivot member is reduced with respect to the friction generated in the pressure-contact portion.

Still further, another ultrasonic motor according to the present invention comprises a piezoelectric element, an oscillator connected to the piezoelectric element, a rotor brought into contact with the vibrator, a pivot member provided in a rotating center of the rotor, pressing member pressure-contacting to the pivot member, and a hard film provided in a pressure-contact portion of at least one of the pivot member and the pressing member.

In this case, it is preferable that the hard film is formed by any one of a DLC, a TiN, a TiCrN, a CrN, a TiCNi, a TiAlN, an $Al_2O_3$, a $ZrO_2$, a SiC, a Cr, a NiP, a WC, a $SiO_2$, a $Ta_2O_5$, a SiN, a SiaAlbOcNd (a sialon).

In accordance with this structure, the pivot member or the pressing member is protected from the friction by forming the hard film, and a durability is improved. Further, since a comparatively soft material can be selected for the pivot member and the pressing member, a selective range for the material is increased as well as a workability for the material is improved.

Furthermore, another ultrasonic motor according to the present invention comprises a piezoelectric element, an oscillator connected to the piezoelectric element, a rotor brought into contact with the oscillator, a pivot member provided in a rotating center of the rotor, and a pressing member pressure-contacting to the pivot member, and a solid lubricant for reducing a friction is provided in at least one of the pressing member and the pivot member.

In this case, it is preferable that the solid lubricant be, a PTFE (a polytetrafluoroethylene), a graphite, a molibuden disulphide or a gold.

In accordance with this structure, the solid lubricant reduces the friction generated in the pressure-contact portion between the pressing member and the pivot member, reduces the friction in the pivot member or the pressing member, and requires no lubricating oil.

Moreover, another ultrasonic motor according to the present invention comprises a piezoelectric element, an oscillator connected to the piezoelectric element, a rotor brought into contact with the oscillator, a pivot member provided in a rotating center of the rotor, and a pressing member pressure-contacting to the pivot member, and a recess portion for holding a lubricating oil provided in a pressure-contact portion between the pressing member and the pivot member.

In this case, the recess portion of the pressure-contact portion can have any cross sectional shape so lone as it can hold the lubricating oil, such as a circular arc cross sectional shape, a rectangular cross sectional shape and a triangular cross sectional shape.

In accordance with this structure, the lubricating oil can be held in the recess portion provided in the pressing member for a long time, and the friction generated in the pressure-contact portion between the pressing member and the pivot member can be reduced for a long time.

Further, as described in claim 8, the structure can be made such that the ultrasonic motor as claimed in any one of claim 1 to claim 7 is provided in an electronic apparatus with an ultrasonic motor.

In another aspect, the present invention is directed to an electronic apparatus having an output mechanism for producing an output motion and an ultrasonic motor according to any one of the foregoing embodiments for driving the output mechanism to produce the output motion.

DETAILED DESCRIPTION OF THE PREFERRED EMBODIMENTS

An embodiment in accordance with the invention will be in detail described below with reference to FIG. 1 to FIG. 5.
{EMBODIMENT 1}

Figure 1:
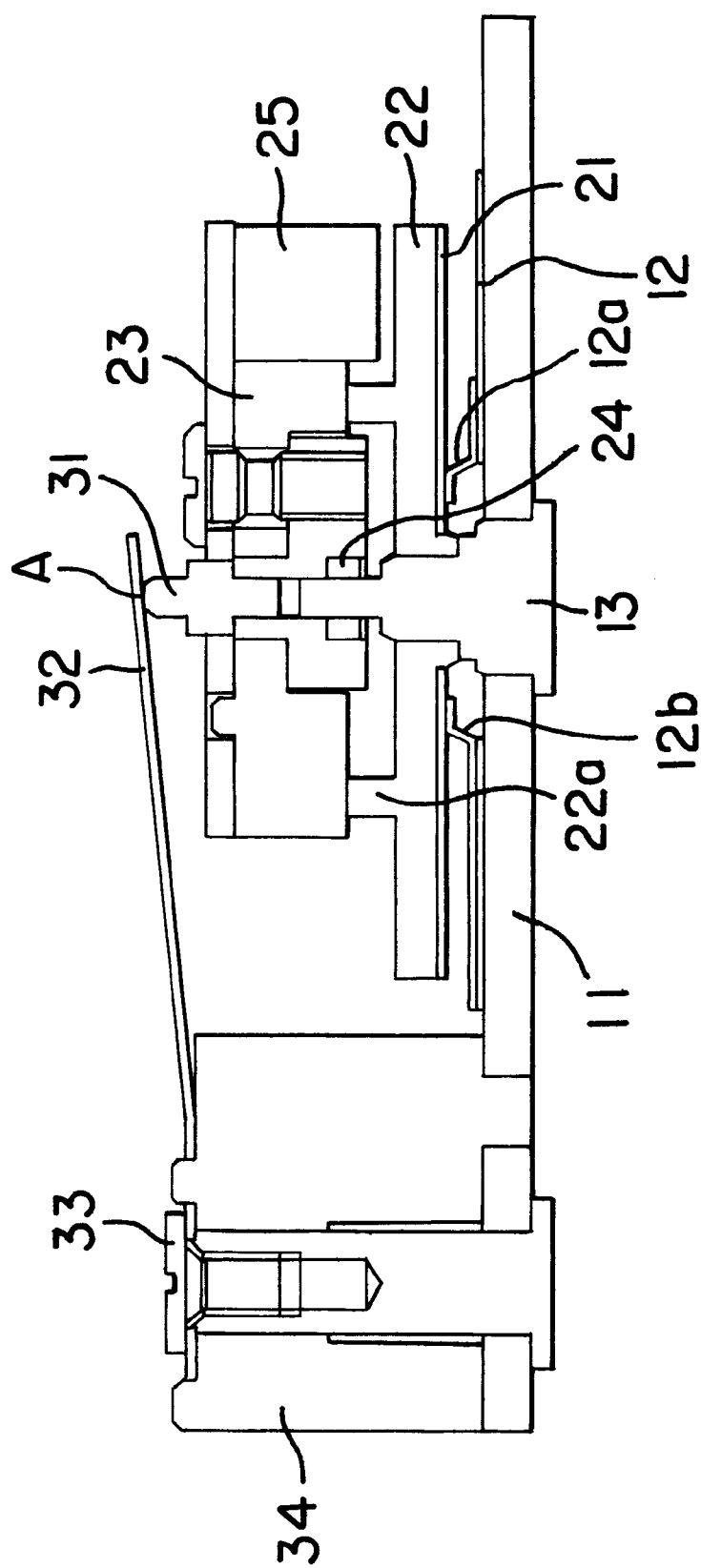
FIG. 1 is a cross sectional view showing an embodiment 1 in which the invention is applied to an ultrasonic motor.
Figure 2:
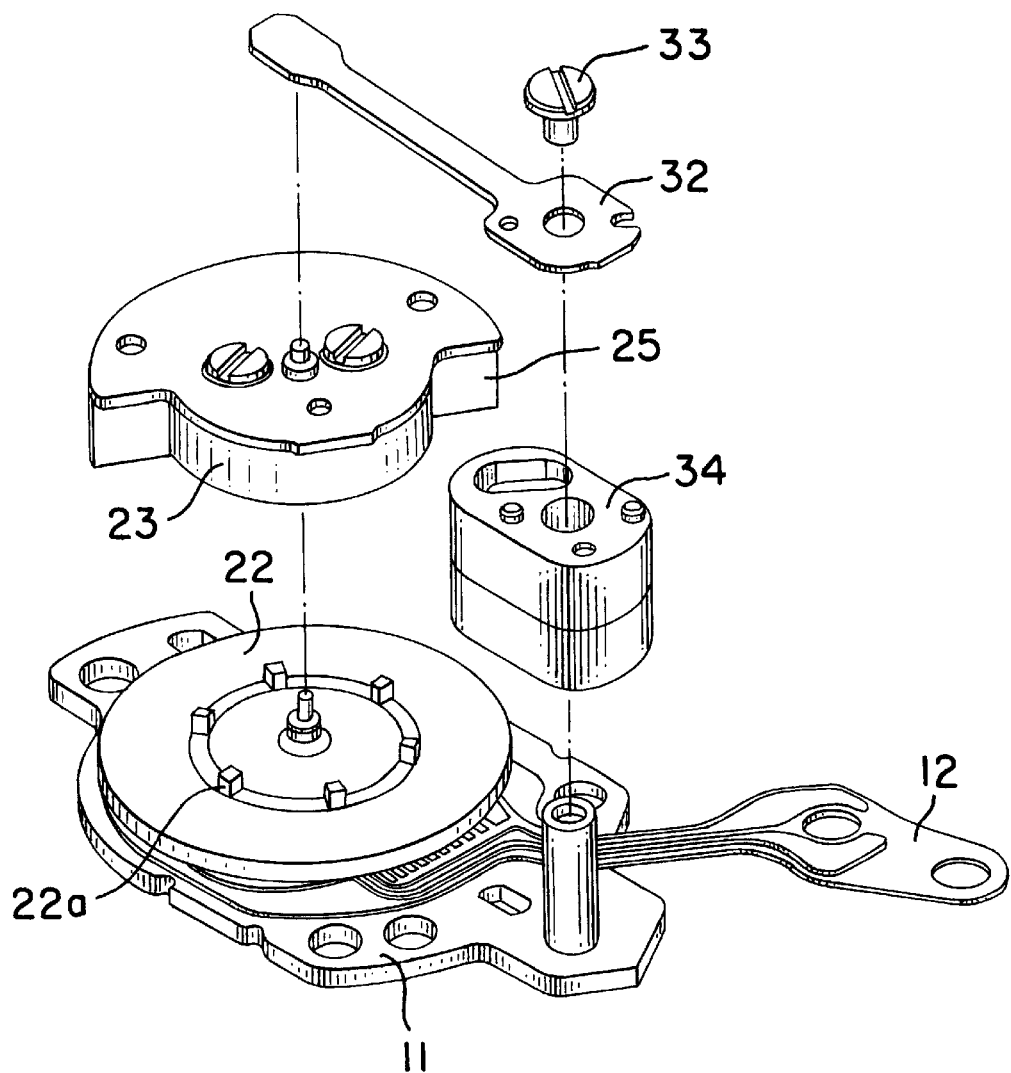
FIG. 2 is an exploded perspective view showing the ultrasonic motor in accordance with FIG. 1.

FIG. 1 is a cross sectional view of an embodiment 1 in which the invention is applied to an ultrasonic motor, and FIG. 2 is an exploded perspective view of an ultrasonic motor.

That is, the embodiment is constituted by a support plate 11 for supporting the ultrasonic motor, a piezoelectric element lead 12 fixed on the support plate 11, a central shaft 13 passing through and fixed to the support plate 11, a vibrating member, such as an oscillator 22, fixed to the central shaft 13, a piezoelectric element 21 bonded to a lower surface of the oscillator 22, a projection 22a projecting over the oscillator 22, a moving member, such as a rotor 23, pressure-contacted to the projection 22a on the oscillator 22, a bush 24 disposed between the rotor 23 and the central shaft 13 for reducing a friction therebetween, a heavy weight 25 provided outside the rotor 23, a pivot 31 as a pivot member in accordance with the invention fixed to a rotating center of the rotor 23, a pressing spring 32 as a pressing member in accordance with the invention pressure-contacting to an upper surface of the pivot 31, a pressure spring seat 34 for placing the pressure spring 32, and a fastening screw 33 fixing the pressure spring seat 34 and the pressure spring 32.

More particularly, the piezoelectric element 21 is formed substantially in a circular plate shape, and made of a barium titanate, a lead titanate, a lithium niobate or a lithium tantalate. Further, it is uniformly separated into twelve portions in a peripheral direction so as to form a fan shape, so that six sets of polarizing portions are provided by setting adjacent two separated portions as a set of polarizing portions. Polarization is performed so that the separated portions in each set of polarizing portions have polarizing directions alternately opposing to each other. In this case, the polarizing direction is made such that as a normal direction, a positive electric field is applied toward a bonding surface to the oscillator 22, and as an opposing direction, a negative electric field is applied toward the bonding surface to the oscillator 22.

An electrode pattern formed substantially in a fan shape in correspondence to each of the separated portions is formed on a non-bonded surface of the piezoelectric element 21 by means of a CVD so as to short-circuit the polarizing portions alternately. Then, one of the electrode patterns is wired to a first lead wire 12a connected to the piezoelectric element lead 12, and the other of the electrode patterns is wired to a second lead wire 12b. Further, all surface electrodes are formed on the bonding surface to the oscillator 22. Then, one of the electrode patterns and the other of the electrode patterns are excited by inputting exciting signals having phases 90 degrees different from each other, so as to generate a progressive wave in a peripheral direction of the oscillator 22.

Here, in the case of using a standing wave method, when driving in a normal direction, the exciting signal is input to one of the electrode patterns so as to excite, thereby generating the standing wave in the oscillator 22. Further, when driving in an opposite direction, the exciting signal having the same phase is input to the other of the electrode patterns so as to excite, thereby generating the standing wave having a phase 90 degrees different from that of the standing wave in the rotor 23.

The oscillator 22 is formed in a disc shape corresponding to the piezoelectric element 21, and is made of an elastic material, for example, an aluminum alloy, a stainless steel and a brass. A column-like projection 22a is provided at a position corresponding to a boundary of the separated portions of the piezoelectric element 21 at a uniform interval. Here, in the case of using a standing wave method, the projections 22a are alternately arranged in the boundary of the separated portions.

The rotor 23 is formed in a cylindrical shape and is provided with a through hole receiving the central shaft 13 thereto in a central portion.

The pivot 31 is formed substantially in a rod shape and produced by using a steel hardened by a heat treatment.

The upper surface of the pivot 31 is pressure-contacted by the pressing spring 32 and is formed in a semispherical shape so as to reduce a contact area with the pressing spring 32. Further, a central portion is formed in such a manner as to make a diameter thereof greater than the other portions and can be engaged with the rotor 23. In this case, the structure of the upper end may be any of a triangular conical shape and a rectangular column shape, and ceramics such as an $Al_2O_3$, a SiC and $Si_3N_4$ and a stainless steel may be employed as a material.

The pressing spring 32 is formed in a rectangular plate-like body and is produced by, for example, a stainless steel. As mentioned above, a friction in a pressure-contact portion A between the pressing spring 32 and the pivot 31 is reduced by using different materials for the pressing spring 32 and the pivot 31. In this case, a spring steel, a BeCu and a phosphor bronze may be used for the material of the pressing spring 32.

Next, an operation of this ultrasonic motor will be described below with reference to FIGS. 1 and 2.

When the exciting signals having phases 90 degrees different from each other are input to one of the electrode patterns and the other of the electrode patterns in the piezoelectric element 21, each of the electrode patterns is excited at the phase 90 degrees different from each other.

The oscillator 22 bonded to the piezoelectric element 21 is bent and oscillated so as to generate a progressive wave, and the projection 22a integrally provided in the oscillator 22 performs an oval motion. The projection 22a is brought into contact with the rotor from an original position to an apex position with respect to a vertical direction of the oval motion, and applies a frictional force in a peripheral direction. The rotor 23 is rotated due to the frictional force.

When the rotor 23 is rotated, a frictional force is generated in the pressure-contact portion A between the pivot 31 and the pressing spring 32. At this time, since the pressing spring 32 and the pivot 31 are made of the different materials, the frictional force is reduced in comparison with the case of using the same material for both elements, so that an abrasion in the pivot 31 or the pressing spring 32 is reduced. Accordingly, the pressing force of the oscillator 22 and the rotor 23 and the frictional force of the oscillator 22 in the peripheral direction can be maintained, so that the rotating speed and the torque of the rotor 23 can be prevented from lowering.

Then, a driven member is rotated or linearly moved due to a rotation of the rotor 23.

As mentioned above, in accordance with this embodiment, since the pressing spring 32 and the pivot 31 are made of different materials, the friction generated in the pressure-contact portion A is reduced and the abrasion in the pivot 31 or the pressing spring 32 is reduced, the pressing force of the oscillator 22 and the rotor 23 and the frictional force of the oscillator 22 in the peripheral direction is maintained, and the rotating speed and the torque of the rotor 23 can be prevented from lowering.

{EMBODIMENT 2}

This modified embodiment has substantially the same structure as that of the embodiment 1, however, is characterized in that a hardness of the pivot 31 is set to be greater than that of the pressing spring 32. In this case, the same structure as that of the embodiment 1 will be omitted in the following description.

As an example for increasing a hardness of the pivot 31, for example, in the case of using a steel for the pressing spring 32 and the pivot 31, only the steel used for the pivot 31 may be heat-treated, the steels having different heat treatment temperatures may be used for the both, and a material having a great hardness such as ceramics such as an $Al_2O_3$, a SiC and a $Si_3N_4$ and a stainless steel may be used for the pivot 31 and the steel not heat-treated may be used for the pressing spring 32.

In accordance with this structure, since the hardness of the pivot 31 is set to be greater than that of the pressing spring 32 and the pressing spring 32 is structured such as to reduce the abrasion of the pivot 31 with respect to the friction generated in the pressure-contact portion A of the pivot 31, a durability of the pivot 31 can be improved.

{EMBODIMENT 3}

Figure 3:
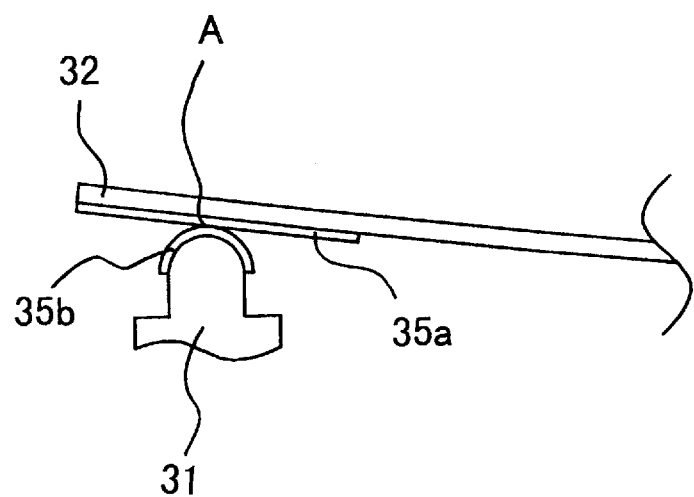
FIG. 3 is a side elevational structure showing embodiment 3 in which the invention is applied to an ultrasonic motor.

FIG. 3 is a view showing a side elevational structure of an embodiment 3 to which an ultrasonic motor in accordance with the invention is applied.

This embodiment has substantially the same structure as that of the embodiment 1, however, is characterized in that hard films 35a and 35b are formed on each of opposing surfaces of the pivot 31 and the pressing spring 32.

The hard film employs a DLC (a diamond like carbon), a TiN, a TiCrN, a CrN, a TiCNi, a TiAlN, an $Al_2O_3$, a $ZrO_2$, a SiC, a Cr, a NiP, a WC, a $SiO_2$, a $Ta_2O_5$, a SiN, a SiaAlbOcNd (a sialon) in view of employing a material having a high hardness. Further, as a molding method of the hard films 35a and 35b, any popular thin film forming method such a plating, a CVD (a chemical vapor deposition), a PVD (a physical vapor deposition), a thermal spraying and a sintering after a dip coating may be employed.

In accordance with this structure, since the pivot 31 and the pressing spring 32 are not directly brought into frictional contact with each other by forming the hard films 35a and 35b, an abrasion can be prevented and a durability can be improved. Further, since a comparatively soft material can be employed for the pivot 31 and the pressing spring 32, a workability for the both can be improved.

Here, in this embodiment, the hard film 35 may be formed on any one of the pivot 31 and the pressing spring 32, the material mutually different from each other may be employed for the hard films of the pivot 31 and the pressing spring 32.

{EMBODIMENT 4}

This embodiment has substantially the same structure as that of the embodiment 1, however, is characterized in that a solid lubricant is dispersed and adhered on each of the opposing surfaces of the pivot 31 and the pressing spring 32.

The solid lubricant may be any of a PTFE (a polytetrafluoroethylene), a graphite, a molybdenum disulphide and a gold. As means for adhesion, for example, the solid lubricant is dispersed into a Ni plating, the plating is grown to a height not over the solid lubricant, thereby adhering to the pivot 31 and the pressing spring 32. As a kind of plating, any of an Ag, a Cu, a Cr, a Fe, a Sn and a Zn may be employed. Further, the solid lubricant may be adhered to any one of the pivot 31 and the pressing spring 32.

In accordance with this structure, since the friction generated in the pressure-contact portion A between the pressing spring 32 and the pivot 31 is reduced and the abrasion in the pivot 31 or the pressing spring 32 is reduced, a durability of the both members 31 and 32 can be improved and no lubricating oil is required, so that the structure can be used under a clean environment such as in a vacuum environment.

In this case, as means for adhering the solid lubricant, in addition to the means for dispersing in the plating, the PTFE and the molybdenem disulphide may be directly sprayed to the pivot 31 or the pressing spring 32 in a state of being melted. Further, the pivot 31 or the pressing 32 may be formed by mixing the solid lubricant 36 to a resin such as a polyacetal and a polyamide or a metal material. Still further, a film may be formed on a surface of the pressure-contact portion A by mixing the solid lubricant to an oil such as a grease.

{EMBODIMENT 5}

Figure 4:
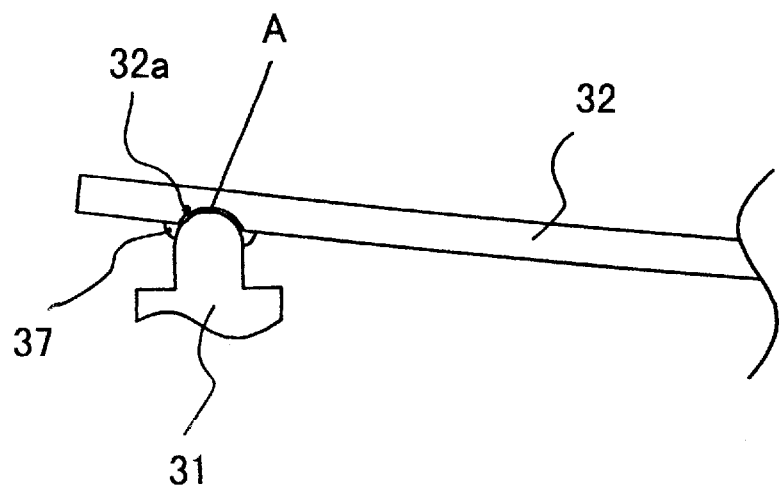
FIG. 4 is a side elevational structure showing an embodiment 5 in which the invention is applied to an ultrasonic motor.

FIG. 4 is a view showing a side elevational structure of an embodiment 5 to which an ultrasonic motor in accordance with the invention is applied.

This embodiment has substantially the same structure as that of the embodiment 1, however, is characterized in that a recess portion 32a having a circular arc cross section is provided in the pressure-contact portion A between the pressing spring 32 and the pivot 31 and a lubricating oil 37 is held in the recess portion 32a.

In accordance with this structure, since the structure is made such that the lubricating oil 37 can be maintained in the recess portion 32a of the pressing spring 32 for a long time, the friction in the pressure-contact portion A between the pivot 31 and the pressing spring 32 can be reduced for a long time and the abrasion in the pivot 31 and the pressing spring 32 can be reduced, so that a durability of the both members can be improved.

In this case, the recess portion 32a may have any cross sectional shape so long as it can hold the lubricating oil 37, such as a rectangular cross sectional shape and a triangular cross sectional shape.

{EMBODIMENT 6}

Figure 5:
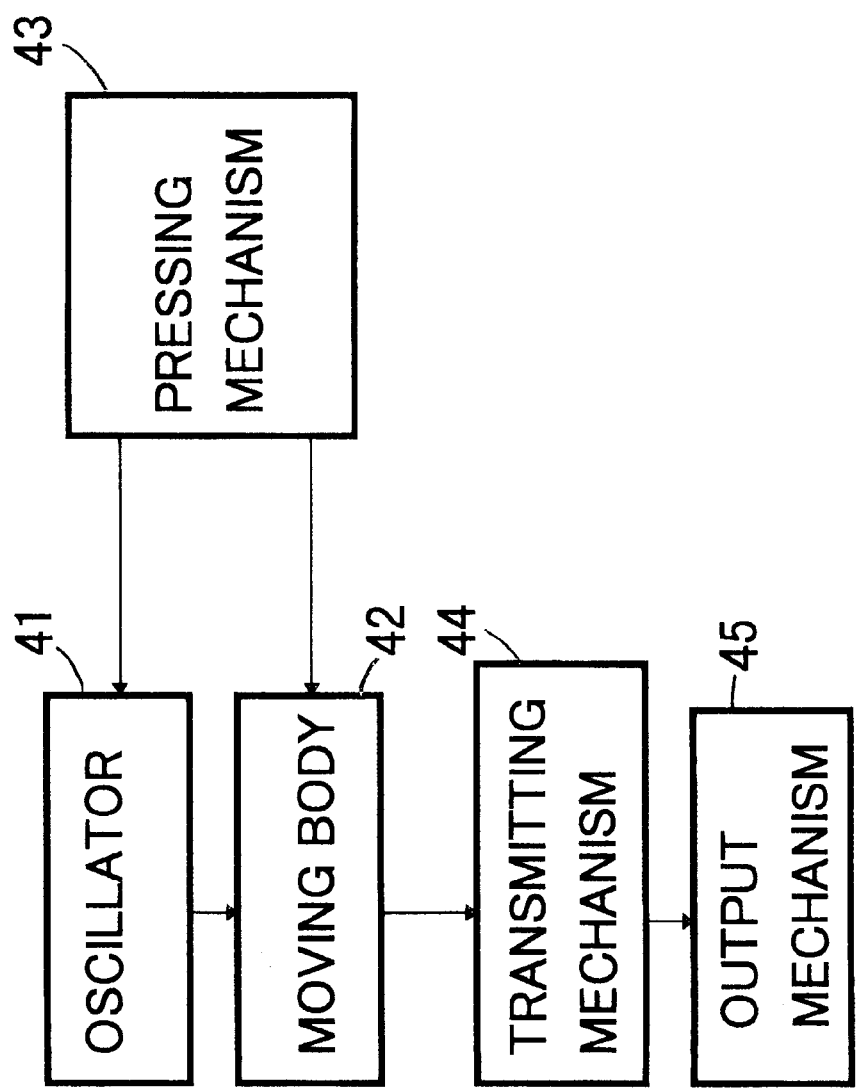
FIG. 5 is a block diagram showing an embodiment 6 in which an ultrasonic motor in accordance with the invention is applied to an electronic apparatus with an ultrasonic motor.

FIG. 5 is a block diagram of an embodiment 6 in which an ultrasonic motor in accordance with the invention is applied to an electronic apparatus.

The electronic apparatus is realized by being provided with an oscillator 41, a moving body 42 movable by the oscillator 41, a pressing mechanism 43 for pressing the moving body 42 and the oscillator 41, a transmitting mechanism 44 movable in an interlocking manner with the moving body 42 and an output mechanism 45 moving on the basis of a motion of the transmitting mechanism 44.

In this case, as the electronic apparatus with the ultrasonic motor, for example, it is applied to an electronic clock, a measuring device, a camera, a printer, a printer, a machine tool, a robot and a moving apparatus.

For example, a transmitting wheel such as a gear and a friction gear is employed for the transmitting mechanism 44.

For example, a shutter drive mechanism and a lens drive mechanism in the case of a camera, a hand drive mechanism and a calendar drive mechanism in the case of an electronic clock and a blade feeding mechanism and a work feeding mechanism in the case of a machine tool are employed for the output mechanism 45.

Further, when the structure is made such that the output shaft is mounted to the moving body 42 and the power transmitting mechanism for transmitting a torque from the output shaft is provided, a drive mechanism can be realized by the ultrasonic motor itself.

As mentioned above, in accordance with the invention, since the pressing member and the pivot member are made of different materials, the friction generated in the pressure-contact portion between the pressing member and the pivot member is reduced and the abrasion in the pressing member or the pivot member is reduced, the rotating speed and the torque of the rotor can be prevented from lowering.

In accordance with the invention since the abrasion of the pivot member is structured to be reduced with respect to the friction generated in the pressure-contact portion, a durability of the pivot member can be improved.

In accordance with the invention, since the pivot member or the pressing member are protected from the friction by forming the hard film, a durability of these members can be improved. Further, since a comparatively soft material can be employed for the pivot member and the pressing member, a workability for these members is improved and a selectable range of the material is increased.

In accordance with the invention since the friction generated in the pressure-contact portion between the pressing member and the pivot member is reduced and the abrasion in the pivot member or the pressing member is reduced, a durability of these members can be improved. Further, since no lubricating oil is required, the structure can be used under a clean environment such as in a vacuum environment.

In accordance with the invention, since the structure is made such that the lubricating oil can be maintained for a long time and the friction generated in the pressure-contact portion between the pressing member and the pivot member can be reduced for a long time, a durability of these members can be improved.

In accordance with the invention, the electronic apparatus with the ultrasonic motor to which the invention is applied can be realized.

What is claimed is:

1. An ultrasonic motor comprising: a piezoelectric element; an oscillator connected to the piezoelectric element; a rotor disposed in contact with the oscillator; a pivot member connected to a central portion of the rotor; a hard film disposed on a surface portion of the pivot member; and a pressing member in pressure contact with the hard film for urging the rotor into pressure contact with the oscillator; wherein the pressing member and the hard film are comprised of different materials, and the material of the hard film has a hardness greater than that of the pressing member.

2. An ultrasonic motor as claimed in claim 1; wherein the hard film is comprised of a material selected from the group consisting of diamond-like carbon, TiN, TiCrN, CrN, TiCNi, TiAlN, $Al_2O_{31}$ $ZrO_2$, SiC, Cr, NiP, WC, $SiO_2$, $Ta_2O_5$, SiN and SiaAlbOcN (a sialon).

3. An ultrasonic motor comprising: a piezoelectric element; an oscillator connected to the piezoelectric element; a rotor disposed in contact with the oscillator; a pivot member connected to a central portion of the rotor; a pressing member having a contact portion in pressure contact with a contact portion of the pivot member for urging the rotor into pressure contact with the oscillator; and a hard film containing a solid lubricant disposed on the contact portion of at least one of the pressing member and the pivot member.

4. An ultrasonic motor according to claim 3; wherein the solid lubricant is comprised of a material selected from the group consisting of polytetrafluoroethylene, graphite, molybdenum and gold.

5. An ultrasonic motor comprising: a piezoelectric element; an oscillator connected to the piezoelectric element; a rotor disposed in contact with the oscillator; a pivot member connected to a central portion of the rotor and having a contact portion; a pressing member having a recess portion for receiving therein in pressure contact the contact portion of the pivot member for urging the rotor into pressure contact with the oscillator; and a lubricating oil disposed in the recess portion of the pressing member.

6. In an electronic apparatus having an output mechanism for producing an output motion, an ultrasonic motor as in any one of claims 1–5 for driving the output mechanism to produce the output motion.

7. An ultrasonic motor comprising: a piezoelectric element; an oscillator connected to the piezoelectric element; a rotor disposed in contact with the oscillator; a pivot member connected to a central portion of the rotor; a pressing member having a contact portion in pressure contact with a contact portion of the pivot member for urging the rotor into pressure contact with the oscillator; and an oil containing a solid lubricant disposed on the contact portion of at least one of the pressing member and the pivot member.

8. In an electronic apparatus having an output mechanism for producing an output motion, an ultrasonic motor according to claim 7 for driving the output mechanism to produce the output motion.

9. An ultrasonic motor comprising: a piezoelectric element having an electrode pattern and being driven by a voltage signal to undergo expansion and compression; a vibrating member connected to the piezoelectric element and vibrationally driven by the expansion and compression movement of the piezoelectric vibrator; a moving member disposed on the vibrating member to be frictionally driven by expansion and compression movement of the piezoelectric element; and pressure regulating means for urging the moving member into pressure contact with the vibrating member, the pressure regulating means having a first member connected to the moving member, a second member having a contact portion in pressure contact with a contact portion of the first member, the contact portion of the first member being comprised of a material different from and having a hardness greater than that of the contact portion of the second member, and a hard film disposed on the first member and defining the contact portion of the first member.

10. An ultrasonic motor as claimed in claim 9; wherein the hard film is comprised of a material selected from the group consisting of diamond-like carbon, TiN, TiCrN, CrN, TiCNi, TiAlN, $Al_2O_{31}$ $ZrO_2$, SiC, Cr, NiP, WC, $SiO_2$, $Ta_2O_5$, SiN and SiaAlbOcN (a sialon).

11. An ultrasonic motor comprising: a piezoelectric element having an electrode pattern and being driven by a voltage signal to undergo expansion and compression; a vibrating member connected to the piezoelectric element and vibrationally driven bv the expansion and compression movement of the piezoelectric vibrator; a moving member disposed on the vibrating member to be frictionally driven by expansion and compression movement of the piezoelectric element; and pressure regulating means for urging the moving member into pressure contact with the vibrating member, the pressure regulating means having a first member connected to the moving member, a second member having a contact portion in pressure contact with a contact portion of the first member, the contact portion of the first member being comprised of a material different from and having a hardness greater than that of the contact portion of the second member, a first hard film disposed on the first member and defining the contact, portion of the first member, and a second hard film disposed on the second member and defining the contact portion of the second member.

12. An ultrasonic motor comprising: a piezoelectric element having an electrode pattern and being driven by a voltage signal to undergo expansion and compression; a vibrating member connected to the piezoelectric element and vibrationally driven by the expansion and compression movement of the piezoelectric vibrator; a moving member disposed on the vibrating member to be frictionally driven by expansion and compression movement of the piezoelectric element; pressure regulating means for urging the moving member into pressure contact with the vibrating member, the pressure regulating means having a first member connected to the moving member and a second member having a contact portion in pressure contact with a contact portion of the first member; and lubricating means disposed between the contact portion of the first member and the contact portion of the second member for reducing friction between the first and second members.

13. An ultrasonic motor according to claim 12; wherein the lubricating means comprises oil containing a solid lubricant disposed on at least one of the contact portion of the first member and the contact portion of the second member.

14. An ultrasonic motor according to claim 12; wherein the lubricating means comprises a hard film containing a solid lubricant disposed on at least one of the contact portion of the first member and the contact portion of the second member.

15. An ultrasonic motor according to claim 14; wherein the solid lubricant is comprised of a material selected from the group consisting of polytetrafluoroethylene, graphite, molybdenum and gold.

16. An ultrasonic motor according to claim 12; wherein the second member has a recess portion receiving the contact portion of the pivot member and having a surface in pressure contact with the contact portion of the pivot member; and wherein the lubricating means comprises a lubricating oil disposed in the recess of the second member.

17. In an electronic apparatus having an output mechanism for producing an output motion, an ultrasonic motor according to claim 12 for driving the output mechanism to produce the output motion.

\* \* \* \* \*